United States Patent [19]

Smith

[11] 3,973,784

[45] Aug. 10, 1976

[54] CUTTING TOOL ADAPTOR

[76] Inventor: Donald Awalt Smith, 1125 Pawnee, Henderson, Nev. 89015

[22] Filed: July 8, 1974

[21] Appl. No.: 486,505

[52] U.S. Cl............................. 279/1 A; 408/239 A
[51] Int. Cl.² ................... B23B 51/08; B23B 51/12
[58] Field of Search............ 279/1 A, 1 R, 60, 1 PC; 81/177 A; 408/238, 239, 240

[56] References Cited
UNITED STATES PATENTS

| | | | |
|---|---|---|---|
| 1,527,757 | 2/1925 | Street | 279/1 R |
| 1,765,362 | 6/1930 | Berry | 279/1 A X |
| 2,393,424 | 1/1946 | Selch | 408/239 X |
| 3,412,594 | 11/1968 | Lund | 408/239 X |
| 3,484,114 | 12/1969 | Rodin | 279/1 R |

*Primary Examiner*—Leon Gilden
*Attorney, Agent, or Firm*—Edward J. Quirk

[57] ABSTRACT

An adaptor for a hand-operated power machine tool, such as a power screwdriver, comprises a sleeve adapted to receive a cutting tool bit in the forward end and an aperture for slidably engaging the shank of the screwdriver bit in the rearward end. The sleeve preferably also comprises a concentric bearing-mounted grip allowing free relative motion between the grip and the sleeve. The adaptor is used for performing a series of operations where a guide cutting is first made in a workpiece, and then a screw is driven into the guide hole.

4 Claims, 3 Drawing Figures

CUTTING TOOL ADAPTOR

BACKGROUND OF THE INVENTION

In many cases, a craftsman is required to fit a series of screws in a workpiece, but must predrill tap holes in the workpiece to enable rapid and true driving of the screws. This necessity occurs frequently in woodworking, for example in fixing molding around a door, or placing decorative facie on furniture, or hanging a door. Sheet metal workers also must predrill screw holes essentially every time a piece of sheet metal is affixed to backing with screws, for example when placing a metal roof. Tap holes are also drilled in plastic, plaster, and other materials of construction prior to setting of screws. In some cases, when it is important to have the head of the screw flush with or slightly below the surface of the workpiece, a countersink may be used either instead of, or in addition to, the tap hole drill.

As a craftsman moves along a workpiece, it is necessary for him to first drill (or countersink) a tap hole, and then drive the screw; then he moves to an adjacent location and repeats the drill/screw sequence. He must either repeatedly change the bit in the power tool from drill bit to screwdriver bit or he must have two, or, if a countersink is to be used in addition to the drill, three power tools each equipped with a different bit. In many cases, it will not be convenient to have multiple power tools, and the constant changing of the bits is unduly time consuming.

Accordingly, it is an object of the invention to provide a quick connect-disconnect coupling device for connecting a rotary cutting bit, such as a drill or countersink bit, to the bit of a power screwdriver.

SUMMARY OF THE INVENTION

An adaptor for rapidly coupling and decoupling a rotary cutting tool to a screwdriver bit comprises a sleeve, bit receiving means for holding a rotary cutting tool bit at one end of said sleeve, and coupling means located at the other end of said sleeve for slidably engaging the bit of a screwdriver such that rotary motion of the screwdriver also drives the bit-receiving means.

DETAILED DESCRIPTION OF THE INVENTION

Figure 1:
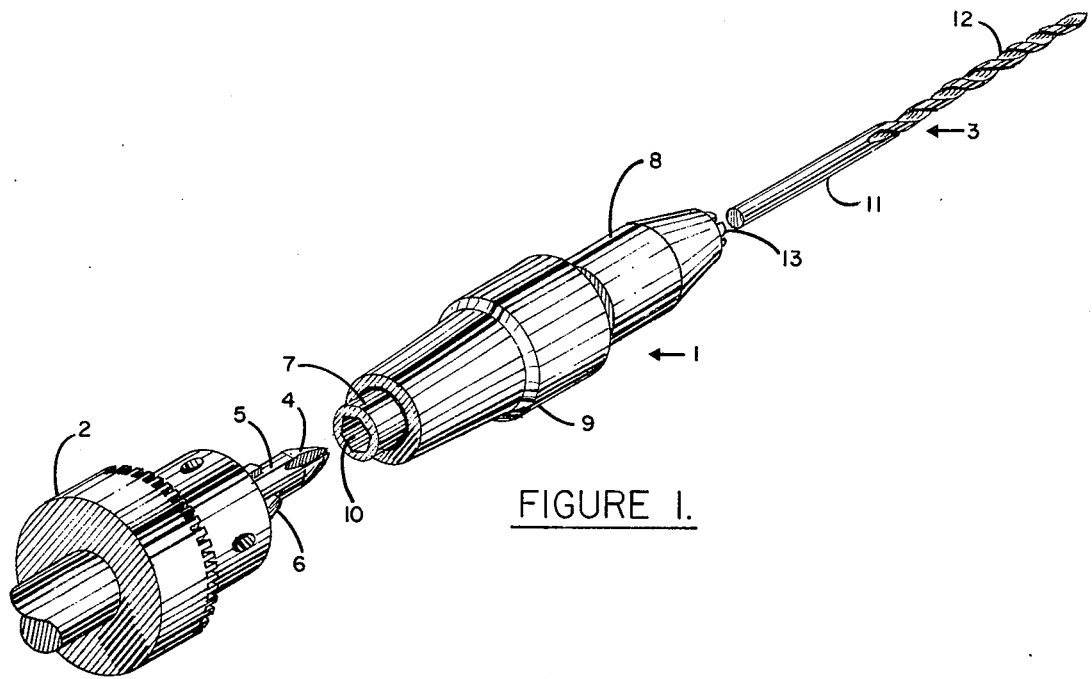
FIG. 1 is an exploded perspective view showing a power screwdriver, the coupling device of the invention, and a drill bit.

Referring to FIG. 1, adaptor 1 is shown between the drive end portion 2 of a rotary power tool and drill bit 3. The rotary power tool is shown with Phillips screwdriver bit 4 held in place by conventional chuck jaws 6. Screwdriver bit 4 has a hexagonal shank 5.

Adaptor 1 comprises elongated sleeve 7 having a chuck 8 mounted on the forward end thereof, and hand grip 9 rotatably mounted concentrically on sleeve 7 for holding the adaptor when it is in use. The sleeve has a longitudinal, hexagonally shaped cavity 10 for slidably engaging shank 5 of the Phillips screwdriver bit. Once engaged, shank 5 fits into aperture 10 such as to resist relative rotary motion of the shank in the aperture, thus allowing the screwdriver shank to drive the sleeve, and consequently drill bit 3.

Figures 2, 3:
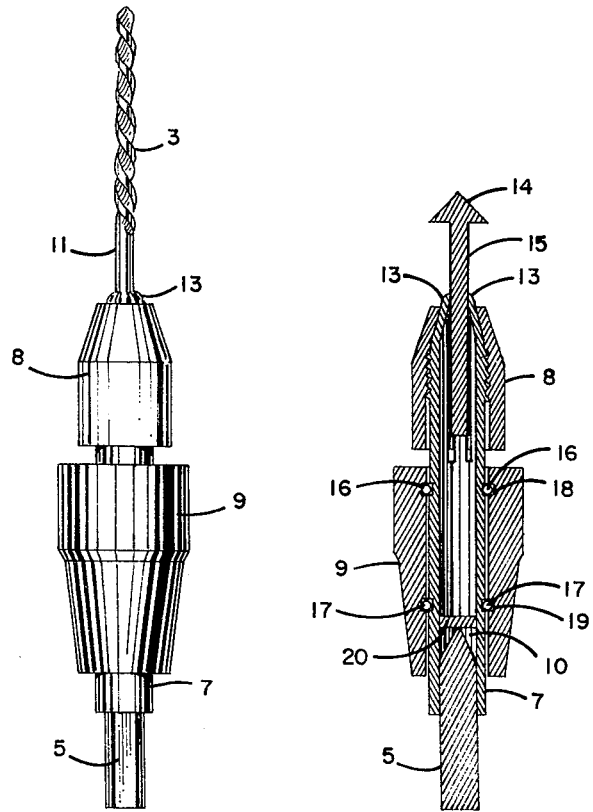
FIG. 2 is a side view of the coupling device in place on the screwdriver bit.
FIG. 3 is a longitudinal section of the coupling device adapted with countersink bit.

Drill bit 3, which consists of shank 11 and work section 12, is shown mounted in the adaptor in FIG. 2. In the modification shown, chuck jaws 13 are formed by simply cutting longitudinal slots in the forward end of sleeve 7. Chuck 8, which is threadedly mounted on the forward end of sleeve 7 (best shown in FIG. 3), may be rotated in a counter-clockwise manner to tighten the grip of the chuck jaws on shank 11 of bit 3. This type of chuck is extremely simple and inexpensively fabricated, but does not have flexibility to accept a wide range of bit sizes. More complex drill chucks may of course be used in accord with the invention to accommodate a wider range of rotary cutting bit sizes if desired. In the alternative, the adaptor could be made simpler and less expensive by eliminating the chuck and using a one-size bit holder, which could be similar to the hexagonal cavity 10 at the rear of the adaptor. If desired, the drill bit could be fixed to the front of the sleeve, e.g., by welding or set screw. FIG. 2 also shows the shaft 5 of screwdriver bit 4 engaged in aperture 10 for driving the sleeve.

FIG. 3 is a longitudinal cross-section of the adaptor shown with a countersink bit 14 in place at the forward end of the sleeve. Chuck 8 is retracted over chuck jaws 13, which grip the shaft 15 of bit 14. Hand grip 9 is mounted with ball bearings 16 and 17 which are in place in grooves 18 and 19, respectively. The grooves are slight peripheral indentations on the outside of sleeve 7 and the inside of grip 9, which provide a track for the balls. Any mounting of the grip on the sleeve which allows easy relative rotation of the grip around the sleeve, without causing eccentric or wobbling motion, is satisfactory. While the grip is shown with a greater outside diameter than the chuck, it may be desirable to have the chuck and grip approximately the same diameter, for esthetic purposes and easy storage.

As shown in FIG. 3, plug 20 is pressed or welded in place in rear cavity 10 of shaft 3 and is preferably magnetic to help hold bit 4 in place. This feature is particularly helpful to allow the power tool to be carried in one hand without the adaptor falling off; in addition, if bit 4 is removed from the power tool for any reason, e.g., storage, the screwdriver bit may be left with the adaptor. In lieu of a magnet, any means which imparts resistance to the bit sliding out from the cavity may be used, such as a "snap-on" ball bearing mount. It is essential to the invention that the adaptor be rapidly connected and disconnected by a simply axial movement of the adaptor, i.e., without twisting or disengaging or locking devices. Nevertheless, some resistance to axial movement, such as provided by magnet or a bearing mount, is desirable.

While the screwdriver bit is shown as a Phillips bit, the invention is not so limited and may be used with any type of screwdriver bit, such as a standard blade bit, hex-head bit, square head bit, clutch head bit, etc. In addition, while the screwdriver bit shank 5 is shown as hexagonal, it may be of any cross-sectional shape which can slidably engage a base of similar cross-sectional shape and resist relative rotation. For example, the cross-section may be square, triangular, or octagonal. A special adaptation is required for the hex-head screw, which is commonly used in sheet metal work. Since the hex-head screwdriver has a female cavity of hexagonal shape for the screw to fit in, the adaptor of the invention preferably has a male shaft of hexagonal cross-section at the rear of the adaptor to engage the shallow female cavity of the hex-head screwdriver bit.

In operation, the adaptor is used as follows. A right-handed craftsman would hold a power hand tool equipped with a screwdriver bit in his right hand, and the grip 9 of the adaptor (which is equipped with a drill or countersink bit) with the fingers of his left hand. He slides the adaptor in place over the screwdriver bit, and drills a tap hole. He then slides the adaptor off, sets a screw with the screwdriver bit, and moves to the next location to repeat the process. With minimal practice, substantial time can be saved in setting a large number of screws.

These and other advantages and embodiments of the invention described herein will be apparent to those skilled in the art.

I claim:

1. An adaptor for rapidly coupling and decoupling a drill attachment to a power driven rotary screwdriver bit, said power screwdriver bit having a shaft of regular polygonal cross-section, said adaptor comprising a sleeve, bit-receiving means for securing a cutting tool bit at the front end of the sleeve, grip means carried by the adaptor for manually maintaining the adaptor on the screwdriver bit, and a cavity at the rear end of the sleeve for slidably engaging the shaft of the power screwdriver bit, the cavity having a regular polygonal cross section and being dimensioned such that when the adaptor is in place, relative rotary motion between the bit and the adaptor is prevented.

2. The adaptor of claim 1 wherein said grip is located external to and rotatably mounted concentrically to said sleeve for holding the adaptor during the cutting operation.

3. The adaptor of claim 1 wherein the rotary cutting tool is a drill or countersink, and the rotary work-producing tool is a power screwdriver.

4. The adaptor of claim 1 wherein the shaft of the bit of the rotary work-producing tool and the elongated cavity have hexagonal cross-sections.

* * * * *